Sept. 20, 1966   H. W. KOHLER   3,273,458
OPTICAL DELAY SYSTEM FOR PROVIDING EYE PROTECTION
AGAINST INTENSE LIGHT
Filed Sept. 28, 1964   2 Sheets-Sheet 1
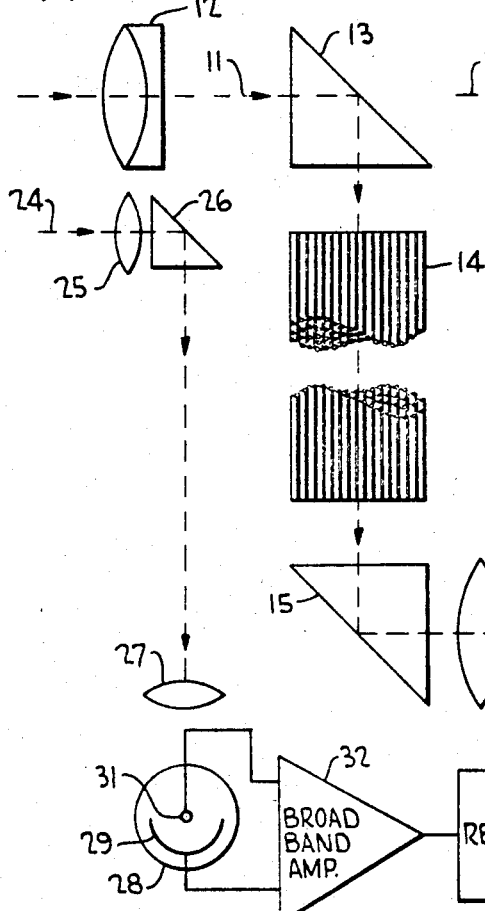
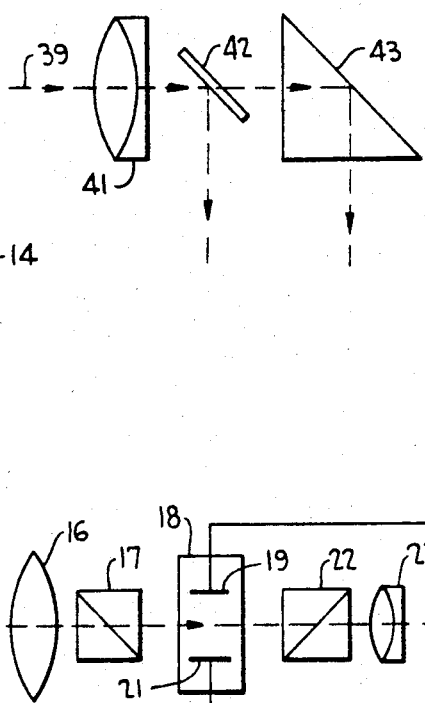
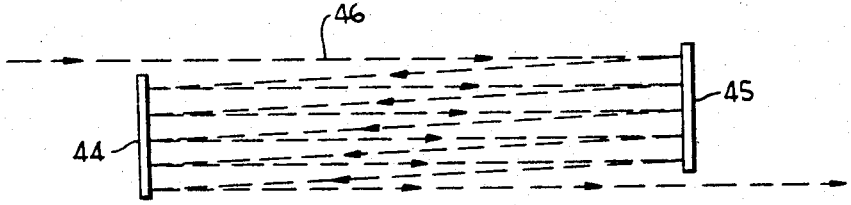
INVENTOR.
HANS W. KOHLER
BY Harry M. Saragovitz,
Edward J. Kelly, Herbert Berl
& J. D. Edgerton
ATTORNEYS

INVENTOR,
HANS W. KOHLER

United States Patent Office 3,273,458
Patented Sept. 20, 1966

3,273,458
OPTICAL DELAY SYSTEM FOR PROVIDING EYE PROTECTION AGAINST INTENSE LIGHT
Hans W. Kohler, Washington, D.C., assignor to the United States of America as represented by the Secretary of the Army
Filed Sept. 28, 1964, Ser. No. 400,304
9 Claims. (Cl. 88—61)

The invention described herein may be manufactured and used by or for the Government of the United States of America for governmental purposes without the payment to me of any royalty thereon.

This invention relates to eye protection against intense light, and more particularly to an electro-optical system in combination with an optical viewing device for protecting an observer against harmful and blinding effects of intense light that may be produced by laser beams which impinge upon the optical viewing device or by atomic or nuclear explosions.

Those concerned with the development of artifacts of war have long recognized the need for effective countermeasures for every new weapon. Today, with the advent of the laser and its potential military applications and with the development of small atomic and nuclear weapons for tactical warfare, there is a need for effective protection of military personnel against the harmful effects of these devices to their vision. While the output power of presently available lasers is insufficient for use in "death rays," it is adequate to, at least temporarily, blind observers looking into a laser beam directly through binoculars, telescopes, periscopes, gunsights, rangefinders, and the like. It appears that in much less time than an observer needs to react, that is within a single or a few laser pulses, his eyesight might be so impaired as to make him a casualty. Similarly, the flash from a tactical atomic or nuclear weapon could also blind an observer making him a casualty.

It is therefore an object of this invention to provide an electro-optical system in combination with an optical device which will protect an observer against the adverse effects of intense light such as that produced by laser beams and atomic or nuclear explosions.

It is another object of the instant invention to provide a system for protecting the eyesight of an observer against the harmful effects of intense light and at the same time warn the observer of the proximity of intense light.

It is a further object of the invention to provide an electro-optical system which is simple and may be readily incorporated in conventional viewing and sighting optical devices and which is effective to protect an observer against intense light.

According to the present invention these and other objects are attained by providing within an optical device having an objective lens and an eyepiece an optical delay means for providing a time delay in the transmission of light from the objective lens to the eyepiece, an inertia-free optical shutter between the optical delay means and the eyepiece, and means connected to the optical shutter for detecting the intensity of the light impinging on the objective lens and causing the optical shutter to close when the light intensity exceeds a predetermined maximum.

The specific nature of the invention, as well as other objects, aspects, uses and advantages thereof, will clearly appear from the following description and form the accompanying drawings in which:

FIG. 1 is a diagrammatic illustration of one embodiment of the invention in combination with a periscope viewing device;

FIG. 2 illustrates a modification of the input optics of the embodiment shown in FIG. 1;

FIG. 3 shows an alternative optical delay means which may be used in the embodiment shown in FIG. 1;

Figure 4:
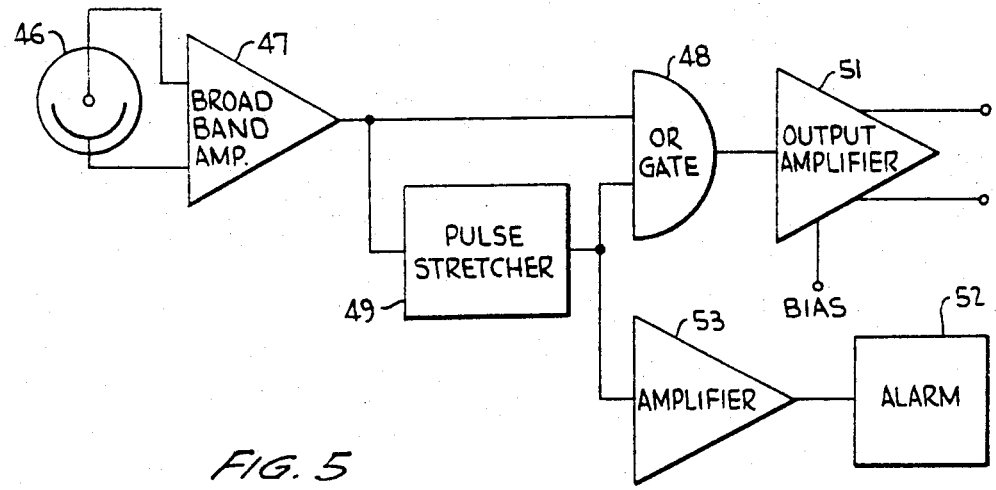
Figure 5:
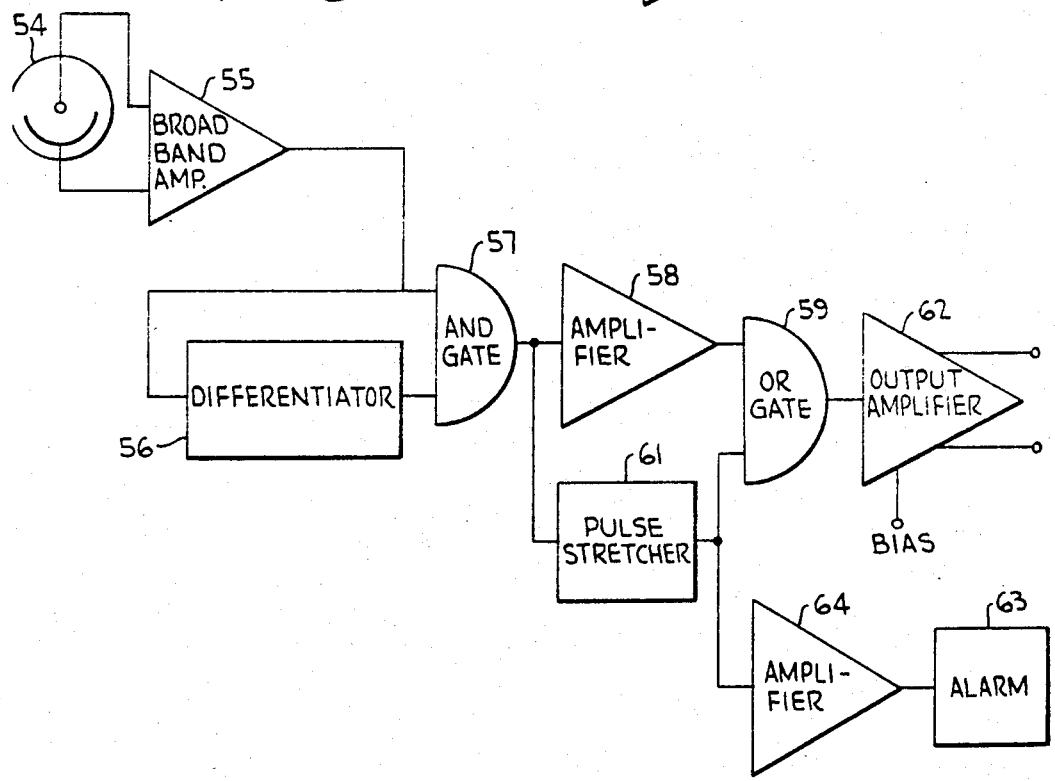

FIG. 4 is a block diagram of a modification of the electrical control circuitry illustrated in FIG. 1 which permits closing the optical shutter for periods of time substantially longer than the duration of an intense light pulse and provides a warning by way of an alarm to the observer of the proximity of intense light; and FIG. 5 is a block diagram of a further modification of the electrical control circuitry which permits recognition of the presence of a non-Q-spoiled laser pulse.

Referring now to the drawings and more particularly to FIG. 1 wherein a periscope is shown modified in accordance with the teachings of the invention. Light, represented by the dotted line 11, enters the device through the objective lens 12 and is deviated through 90° by the right angle reflecting prism 13. The deviated light then passes through a bundle of optical fibers 14 of suitable length to produce a time delay in the transmission of the light of about twenty nanoseconds ($2 \times 10^{-8}$ seconds). The delayed light is then deviated through 90° by a second right angle reflecting prism 15 and enters an inertia-free optical shutter. The optical shutter comprises lens 16 followed by a polarizer 17 which is placed in front of a Kerr cell 18. The Kerr cell 18 has two capacitor plates 19 and 21 placed on either side and parallel to the light path. The capacitor plates 19 and 21 are immersed in a liquid which exhibits the Kerr effect such as nitrobenzol. On the other side of Kerr cell 18 is an analyzer 22 which has its polarizing axis aligned with the axis of polarizer 17. The analyzer 22 is followed by eyepiece lens 23 through which an observer looks.

Light, represented by the dotted line 24, from the same source from which the light entering the objective lens 12 emanates, passes through lens 25 and is deviated through 90° by right angle reflecting prism 26. The deviated light is then focused by lens 27 on photocell 28. The photocell 28 is illustrated as being the photoemissive type having a cathode 29 and an anode 31, the cathode being coated with a thin layer of photoemissive material. It is to be understood, however, that other and different photocells such as semiconductor photocells may be used with equal effect. The output of photo cell 28 is amplified by a wideband amplifier 32 whose output is rectified by rectifier 33 and applied to the input of the output amplifier 34. The output amplifier 34 is biased by a source of bias voltage applied at terminal 35 to establish a threshold operating level. When the threshold is exceeded, output amplifier 34 develops an output voltage which is applied across the capacitor plates 19 and 21 of Kerr cell 18 by way of wires 36 and 37, respectively.

In operation, the output amplifier 34 is biased so that in bright daylight the bias overrides the signal produced by broad band amplifier 32. As a result, ordinarily no voltage is applied across the capacitor plates 19 and 21 of Kerr cell 18, and maximum transmission of the image takes place. When intense light impinges on the optical device, the photocell signal increases causing the output signal of broad band amplifier 32 to increase beyond the threshold value determined by the bias of output amplifier 34. The output amplifier 34 then develops a voltage across the capacitor plates 19 and 21 of Kerr cell 18. When voltage is applied to the capacitor plates 19 and 21, the molecules in the liquid in which they are immersed are polarized and produce artificial birefringence. This is known as the Kerr effect and operates to rotate the plane of polarization of the polarized light that enters the Kerr cell 18 and thereby varies the amount of light transmitted by the analyzer 22, reducing the transmission to zero when a certain light level impinging on the optical device is exceeded. The optical delay means 14 is used to provide time to recognize the presence of light pulses and actuate the optical shutter before the light reaches the observer's eyes.

Instead of separate input optics for the optical device and the light intensity sensing circuitry as shown in FIG. 1, the input optics can be combined as shown in FIG. 2. Here, light, represented by the broken line 39, passes through the objective lens 41 and is partially reflected by half silvered mirror 42 which is placed at a 45° angle to the light path. The reflected light is then focused on a photocell as illustrated in FIG. 1. The transmitted light is deviated through 90° by right angle reflecting prism 43 and passes into an optical delay means in the same manner as shown in FIG. 1.

While the optical devices shown in FIGS. 1 and 2 with which the invention is illustrated particularly relate to periscopes, it is to be understood that any optical viewing device may be modified in accordance with the teachings of this invention such as for example binoculars, telescopes, gunsights, bombsights, rangefinders and the like.

An alternative optical delay means to the bundle of optical fibers shown in FIG. 1 is illustrated in FIG. 3. Here the optical delay is provided by multiple reflections of the observed image between mirrors 44 and 45, the broken line 46 representing the optical path. Since the time delay in the light transmission is on the order of twenty nanoseconds, an optical path length of twenty feet is required.

In the case of protection against laser beams, a series of pulses can usually be expected. It is therefore desirable to keep the optical shutter closed for a period of time considerably longer than the duration of a single laser pulse and preferably longer than the expected duration of a series or burst of laser pulses. This is conveniently accomplished by the circuitry illustrated in FIG. 4. The signal from the photocell 46 is amplified by broad band amplifier 47 whose output is applied as one input to OR gate 48. The output of broad band amplifier 47 is also applied to the input of pulse stretcher 49. The pulse stretcher 49 may be, for example, a monostable multivibrator having an RC time constant considerably greater than the duration of a laser pulse. The output of the pulse stretcher 49 is applied as the second input to OR gate 48. The operation of OR gate 48 is such as to provide an output when there is an input signal from either broad band amplifier 47 or pulse stretcher 49. The output of OR gate 48 is applied as the input to output amplifier 51 which is biased as before and whose output is applied across the capacitor plates of the Kerr cell of the optical shutter as illustrated in FIG. 1. By adjusting the RC time constant of pulse stretcher 49, the optical shutter can be kept shut for any desired period of time.

A warning of the proximity of intense light can be provided for the observer by activating a suitable aural or visual alarm 52. To accomplish this, a driver amplifier 53 which receives as its input the output of pulse stretcher 49 is provided.

In case it is found necessary to establish the presence of a laser pulse, as where a non-Q-spoiled laser is being observed, the circuitry shown in FIG. 5 can be used. In this case, the signal from photocell 54 is amplified by broad band amplifier 55 as before, but the output of broad band amplifier 55 is connected to the input of differentiator 56 and the first input of AND gate 57. The function of the differentiator 56 is to recognize the leading edge of pulse signal and provie a pulse output signal. The operation of the AND gate 57 is such as to provide an output only when an input provided by the broad band amplifier 55 is coincident in time with an input provided by differentiator 56. The output of AND gate 57 may then be amplified by amplifier 58 and supplied as one input to OR gate 59. The output of AND gate 57 would also be supplied as the input to pulse stretcher 61 which has its input connected as the second input to OR gate 59. The output of OR gate 59 is connected to the input of the output amplifier 62 as before. An alarm 63 and its driver amplifier 64 may again be provided as described with reference to FIG. 4.

It will be apparent that the embodiments shown are only exemplary and that various modifications can be made in construction and arrangement within the scope of the invention as defined in the appended claims.

I claim as my invention:

1. In combination with an optical viewing device having an objective lens and an eyepiece lens, an electro-optical system for protecting an observer against harmful and blinding effects of intense light that may be produced by laser beams which impinge upon the optical viewing device or by atomic or nuclear explosions comprising:
    (a) an optical delay means for receiving light from said objective lens and for providing a short time delay in the transmission therethrough of light so received,
    (b) an inertia-free optical shutter between said optical delay means and said eyepiece lens, said inertia-free optical shutter being normally open permitting free transmission of light therethrough from said optical delay means to said eyepiece lens, and
    (c) means connected to said inertia-free optical shutter for detecting the intensity of the light impinging on said objective lens and causing said inertia-free optical shutter to close when the light intensity exceeds a predetermined maximum.

2. An electro-optical system for protecting an observer against harmful and blinding effects of intense light as defined in claim 1 wherein said inertia-free optical shutter comprises:
    (a) a polarizer receiving light from said optical delay means and polarizing the light in one direction,
    (b) an analyzer receiving light from said polarizer and having its polarization axis parallel to said polarizer, and
    (c) a Kerr cell between said polarizer and said analyzer and having two capacitor plates immersed in a transparent vessel filled with a liquid that exhibits the Kerr effect.

3. An electro-optical system for protecting an observer against harmful and blinding effects of intense light as defined in claim 2 wherein said optical delay means comprises a bundle of optical fibers having first and second ends and a length which will produce the desired time delay, said first end being positioned to receive light from said objective lens and said second end being positioned to transmit the light received by said first end to said inertia-free optical shutter.

4. An electro-optical system for protecting an observer against harmful and blinding effects of intense light as defined in claim 2 wherein said optical delay means comprises a plurality of mirrors positioned to receive light from said objective lens and produce multiple reflections between said mirrors to produce an optical path length in air sufficient to cause the desired time delay.

5. An electro-optical system for protecting an observer against harmful and blinding effects of intense light as defined in claim 2 wherein said means for detecting the light impinging on said objective lens comprises:
    (a) a photocell positioned to receive light directed at said objective lens, and
    (b) means for receiving a signal produced by said photocell and applying a voltage to the capacitor plates of said Kerr cell when the signal from said photocell exceeds a predetermined maximum.

6. An electro-optical system for protecting an observer against harmful and blinding effects of intense light as defined in claim 5 wherein said means for receiving a signal produced by said photocell includes:
  (a) a broad band amplifier connected to said photocell, and
  (b) an output amplifier connected to and receiving the amplified output signal from said broad band amplifier and providing an output voltage which is applied across the capacitor plates in said Kerr cell when the amplified signal from said broad band amplifier exceeds a bias signal applied to said output amplifier.

7. An electro-optical system for protecting an observer against harmful and blinding effects of intense light as defined in claim 6 wherein said means for receiving a signal produced by said photocell further includes:
  (a) a pulse stretcher connected to and receiving the amplified output signal from said broad band amplifier and providing an output signal having a substantially longer time duration than the amplified output signal of said broad band amplifier, and
  (b) an OR gate connected to and receiving the output signals of said broad band amplifier and said pulse stretcher and providing an output signal which is either the output signal of said broad band amplifier or the output signal of said pulse stretcher to said output amplifier.

8. An electro-optical system for protecting an observer against harmful and blinding effects of intense light as defined in claim 7 wherein said means for receiving a signal produced by said photocell further includes:
  (a) a differentiator connected to and receiving the amplified output signal of said broad band amplifier and producing an output signal which is the output signal of said broad band amplified differentiated, and
  (b) an AND gate connected to and receiving the output signals from said broad band amplifier and said differentiator and providing an output signal only when the output signals of said broad band amplifier and said differentiator are coincident in time to said OR gate.

9. An electro-optical system for protecting an observer against harmful and blinding effects of intense light as defined in claim 7 further including means receiving the output signal from said pulse stretcher for producing an alarm to warn the observer of the proximity of intense light.

References Cited by the Examiner

UNITED STATES PATENTS

| | | | |
|---|---|---|---|
| 2,926,293 | 2/1960 | Camm et al. | 88—1 |
| 3,152,215 | 10/1964 | Barstow et al. | 88—61 |
| 3,167,607 | 1/1965 | Marks et al. | 88—1 |

DAVID H. RUBIN, *Primary Examiner.*

BENJAMIN A. BORCHELT, *Examiner.*

V. R. PENDEGRASS, R. L. WIBERT,
  *Assistant Examiners.*